Nov. 5, 1929.    R. C. ALLEN    1,734,458
SHAFT PACKING
Filed June 17, 1925    2 Sheets-Sheet 1

WITNESSES:
R.E.B.Wakefield

R.C.Allen
INVENTOR
BY D.C.Davis
ATTORNEY

R. C. Allen
INVENTOR

BY D. C. Davis
ATTORNEY

Patented Nov. 5, 1929

1,734,458

UNITED STATES PATENT OFFICE

ROBERT C. ALLEN, OF SWARTHMORE, PENNSYLVANIA, ASSIGNOR TO WESTINGHOUSE ELECTRIC & MANUFACTURING COMPANY, A CORPORATION OF PENNSYLVANIA

SHAFT PACKING.

Application filed June 17, 1925. Serial No. 37,712.

My invention relates to shaft packing, particularly to packing for sealing the rotor shafts of elastic fluid motors such as, for example, steam turbines and it has for an object to provide apparatus of the character designated which shall be capable of effectively sealing against extraordinarily high steam pressures and which shall be adapted to conserve a fair proportion of the heat energy developed in the sealing process.

Figure 1:
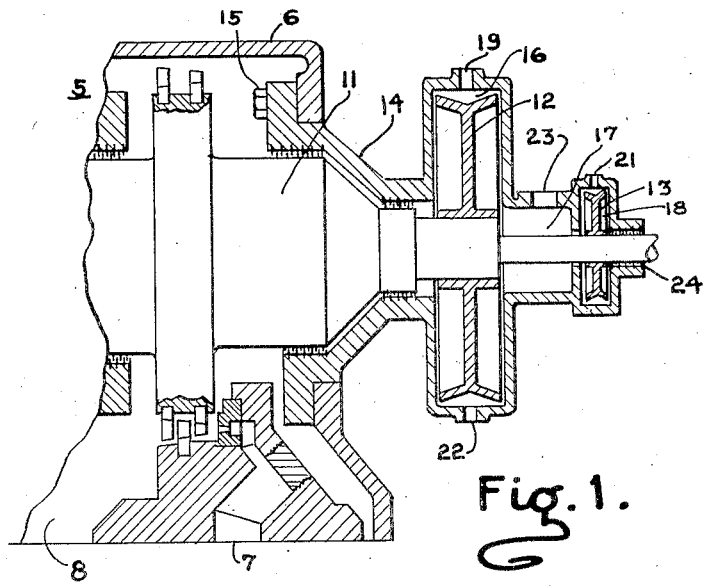
Figure 2:
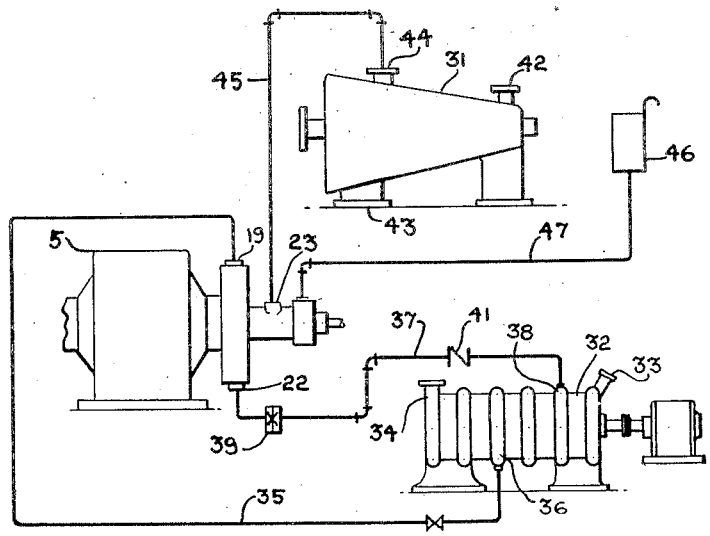
Figure 3:
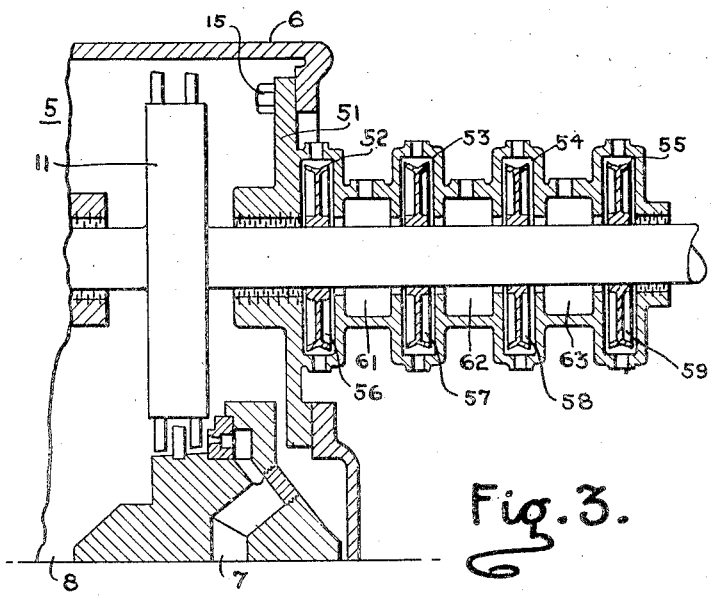
Figure 4:
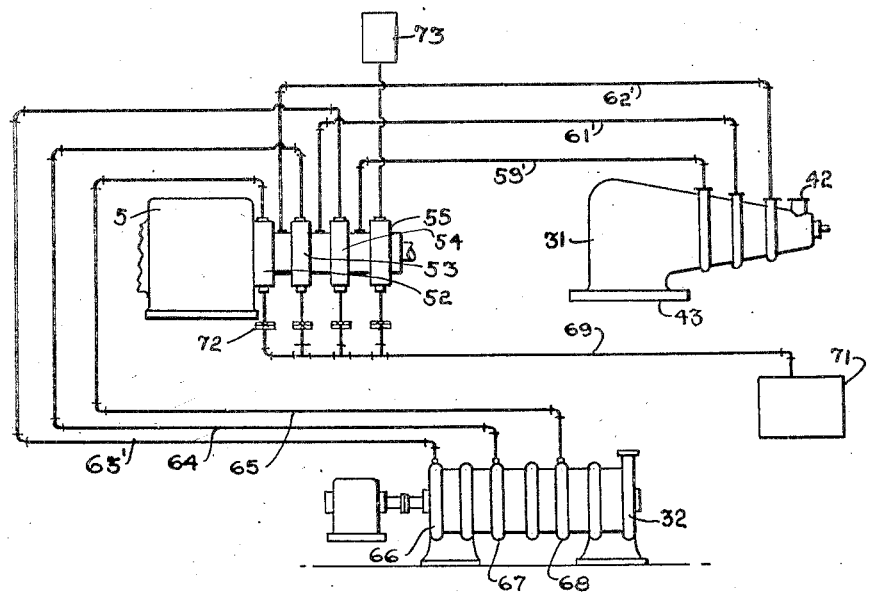

These and other objects, which will be made apparent throughout the further description of my invention, are set forth in the following specification and illustrated in the accompanying drawings in which:

Fig. 1 is a view, in sectional elevation, of one form of my novel shaft packing device; Fig. 2 is a diagrammatic arrangement of a system for sealing the rotor shaft of a steam turbine, which system employs the packing device illustrated in Fig. 1; Fig. 3 is a view, in sectional elevation, of another form of packing device embodying a plurality of pressure zones in lieu of the single pressure zone employed in Fig. 1 and Fig. 4 is a diagrammatic arrangement of a system for sealing the rotor shaft of a steam turbine which employes the form of packing device illustrated in Fig. 3.

Centrifugal liquid sealing devices for packings are generally recognized as providing a very effective means for preventing leakage of fluid between the rotor and the casing of steam turbines. Apparatus of this character generally includes a runner which is attached to the turbine rotor and adapted to operate in a closed annular chamber communicating with the turbine casing. In operation, the centrifugal action of the rotating runner maintains a relatively small quantity of water, which is present in the annular chamber, against the outer walls, at a pressure sufficient to prevent leakage of air into the turbine, as under high vacuum conditions. or steam from leaking out of the turbine, as under atmospheric or back pressure exhaust conditions.

Glands of this character have heretofore been generally employed to seal against relatively small differences in pressure, for example, about fifteen pounds per square inch. In view of the fact, however, that it is now proposed to construct compound turbines having a high pressure element operating at a steam pressure of, for example, 1200 lbs. per square inch and exhausting against a back pressure of approximately 300 lbs. per square inch, it becomes necessary to provide a gland which shall be capable of effectively sealing against a pressure difference of 300 lbs. per square inch or more. Under such conditions of operation, the gland systems of the character heretofore employed are not capable of maintaining an effective seal without incurring objectionable heat losses.

I have therefore conceived the idea of establishing a plurality of progressively decreasing pressure zones by providing a plurality of packing elements or gland runners, each runner being adapted to seal against a portion only of the entire pressure difference. The steam or vapor produced incidentally in the operation of the packing, is thus generated at a pressure sufficient to be utilized as motive fluid in the low pressure turbine element. In this way, a part of the heat units are retained in the system and the steam or vapor, which may be generated at pressures of, for example, 130, 50 and 15 lbs. per square inch, may be utilized to augment the motive fluid supplied to the low pressure turbine element in the usual way. It is therefore apparent that with the use of a multiple pressure packing element, such as herein proposed, substantial operating economies may be effected.

My system for sealing the rotor shaft of the turbine is so arranged that the necessary sealing liquid for the respective gland runners may be supplied from suitable stages of a multi-stage pump provided for that purpose or, preferably, it may be bled from the boiler feed pump ordinarily contained in the power plant. In view of the high operating temperatures, I may avoid such excessive ebullition of the sealing liquid as might interfere with the maintenance of a complete seal by maintaining a continuous circulation of liquid around each runner. This may be readily accomplished by permitting a return flow of some of the liquid to relatively lower pressure stages of the pump.

Referring now to the drawings for a more detailed description of my invention, I show in Fig. 1 a high pressure turbine element 5. The high pressure turbine elements 5 is provided with a casing 6 having a steam inlet 7 and an exhaust connection 8. Disposed within the casing 6 is a rotor 11 and secured to the rotor 11 is a primary gland runner 12 and a secondary gland runner 13. The gland runners 12 and 13 are arranged within a housing 14 which is secured to the turbine casing 6 as by bolts 15. The housing 14 is divided into a primary sealing chamber 16, a pressure zone chamber 17 and a secondary sealing chamber 18. Sealing liquid inlets 19 and 21 are provided respectively in the primary and secondary sealing chambers 16 and 18 while a sealing liquid outlet 22 is also provided in the primary chamber 16. An outlet 23 is located in the pressure zone chamber 17 and a plurality of labyrinth packing elements 24 may be provided between the rotor and the housing upon the side of the secondary runner remotely disposed from the turbine.

In Fig. 2 I show the high pressure turbine element 5, a low pressure turbine element 31 and a multiple stage pump 32. The pump 32 is provided with an inlet or low pressure end 33 and an outlet or high pressure end 34. Sealing liquid is conveyed to the inlet 19 of the primary sealing chamber by a conduit 35 which connects with a relatively high pressure stage 36 of the pump 32. Sealing liquid is returned from the outlet 22 by means of a conduit 37 to a relatively low pressure stage 38. An orifice 39 and a check valve 41 are provided in the conduit 37. The low pressure turbine element 31 is provided with a steam inlet 42, an exhaust connection 43 and an intermediate steam admission connection 44 which is connected to the pressure zone outlet 23 of the high pressure turbine gland by a conduit 45. Sealing liquid may be supplied to the inlet 21 of the secondary sealing chamber from a gravity tank 46 through a conduit 47.

The operation of this embodiment of my invention is as follows:

Steam is admitted to the inlet 7 of the high pressure turbine element 5 at a pressure of, for example, 1200 lbs. per square inch, and is exhausted through the exhaust connection 8 at a pressure of for example 300 lbs. It is therefore necessary for the packing device to seal against a difference in pressure of 300 lbs., and that of the atmosphere. Sealing liquid is therefore conveyed to the primary sealing chamber 16 from the stage 36 of the pump 32 at a pressure slightly in excess of 300 lbs. per square inch or, for example, 350 lbs. per square inch. This liquid is held in the form of a solid annulus in the small gland space between the runner 12 and the chamber 16 by the centrifugal pumping action of the runner. The pressure of the water supplied is greater than that set up by the gland runner so that there is some circulation of water through the return conduit 37 to the relatively low pressure stage 38 of the pump 32. Pressure maintained in this stage of the pump may, for example, be 250 lbs. per square inch and the orifice 39 is provided for maintaining a higher pressure in the sealing chamber.

The diameter of the primary runner 12 is such that it is capable of maintaining a sufficient depth of liquid as will balance the pressure of 300 lbs. on the turbine side and a pressure of, for example, 15 lbs. on the opposite side. In this way, a pressure of 15 lbs. per square inch is maintained in the pressure zone chamber 17. Owing to the differences in pressure prevailing on opposite sides of the gland runner 12, there is a constant conduction of heat from the high pressure side of the runner to the low pressure side, which heat conduction effects vaporization of some of the sealing liquid. There is also a transformation of mechanical energy into heat due to the friction of the sealing liquid on the walls of the runner and chamber. With my arrangement, however, the vapor or steam thus formed may be conserved in the power plant system by conveying it through the conduit 45 to the intermediate inlet 44 of the low pressure turbine element wherein it is utilized to augment the motive fluid supplied through the main inlet 42. While I have embodied in my invention facilities for venting the pressure zone chamber into the low pressure turbine element, it is to be understood that in lieu of such an arrangement I may vent the pressure zone chamber into any form of apparatus which may be suitable for that purpose or I may vent it directly into the atmosphere.

The amount of sealing liquid returned to the pump through the conduit 37 is so regulated as to prevent such excessive vaporization of the sealing liquid as might possibly interfere with the maintenance of a solid annulus. However, it is within the purview of my invention to omit this return connection or I may return this sealing liquid to a drainage reservoir in lieu of the low pressure stage of the pump, as I have illustrated. The secondary gland runner 13 is of a type that is well-known in the art and is utilized for preventing the escape of the fluid in the pressure zone chamber 17 to the atmosphere. In other words, this runner seals against ordinary pressure differences; that is, approximately 15 pounds per square inch. It is supplied with liquid in a manner well-known in the art from the gravity tank 46 which is disposed at such a sufficient height above the runner as will maintain a static head of, for example, 20 pounds per square inch.

In Figs. 3 and 4 I show a preferred embodiment of my invention in which I associate with the turbine casing 6 a gland housing 51 having first, second, third and fourth sealing chambers 52, 53, 54 and 55. Provided in each sealing chamber are respective gland runners 56, 57, 58 and 59 establishing first, second and third pressure zone chambers 61, 62 and 63. With this arrangement, the exhaust or back pressure of 300 pounds of the turbine 5 is progressively reduced to that of the atmosphere and I may, for example, maintain pressures of 130, 50 and 15 pounds per square inch in the respective pressure zone chambers 61, 62 and 63. In this manner, the diameter of each gland runner need only be such as to be capable of maintaining a sufficient depth of annulus to balance only a portion of the entire pressure difference of 300 pounds. The main advantage, however, of such a system resides in the fact that the steam generated in the respective gland runners is developed at pressures closely approaching that of existing stage pressures of the turbine and thus it is possible to convey the steam generated at these three pressures through conduits 59', 61' and 62' to suitable pressure stages or intermediate inlets of the low pressure turbine 31, the steam thus admitted augmenting the motive fluid supplied through the main inlet 42. Sealing liquid for the respective runners may be supplied through conduits 63', 64 and 65 connecting respectively with suitable pressure stages 66, 67 and 68 of the pump 32. Liquid may be discharged from the respective gland runners to a drain conduit 69 connecting with the drainage reservoir 71. A suitable orifice 72 is provided in the drain connection of each sealing chamber for preventing a failure of pressure therein by reason of flow to the drain. The fourth sealing chamber 55 is supplied with liquid at the required pressure from a gravity tank 73 in the usual manner.

It will be apparent from the foregoing description of my invention that I have invented a liquid sealing gland which is of the multiple stage type and which is especially adapted for sealing against extraordinarily high pressure differences. Furthermore, I have so associated my novel form of gland packing with the various turbine elements and pumps contained in the power plant that all heat units developed in the sealing process are retained in the system. One of the main advantages of my multiple gland resides in the fact that the vapor or steam generated incidentally in the sealing process is produced at pressures considerably higher than is possible with glands of the ordinary type and, as the steam thus generated is utilized as motive fluid, it is apparent that I have substantially improved the operating efficiency of liquid sealing glands.

While I have associated my novel form of gland with the high pressure element of a compound turbine, nevertheless, it is to be understood that such a gland may be applied to various forms of turbines and that it may be vented directly to the atmosphere or to any suitable apparatus in the power plant.

While I have shown my invention in but two forms, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

What I claim is:

1. In a system for sealing the rotor shaft of an elastic fluid turbine against fluid leakage, the combination of a high pressure turbine, a chamber defining a zone of relatively low pressure associated with the high pressure turbine, a centrifugal liquid sealing element interposed between the pressure zone and the high pressure turbine, means for withdrawing vapor from the pressure zone chamber and maintaining a pressure therein, and means for maintaining a liquid annulus for sealing the pressure zone chamber against atmospheric pressure.

2. In a system for sealing the rotor shaft of an elastic fluid turbine against fluid leakage, the combination of a high pressure turbine, a plurality of chambers defining progressively changing pressure zones associated with the high pressure turbine, means for maintaining a liquid sealing annulus between adjacent zone chambers and between one zone chamber and the turbine, means for sealing one zone chamber against atmospheric pressure, and means for withdrawing vapor generated in the respective pressure zone chambers and maintaining the progressively changing pressures therein.

3. In a system for sealing the rotor shaft of an elastic fluid turbine against fluid leakage, the combination of a high pressure turbine, a plurality of chambers defining successively decreasing pressure zones associated with the high pressure turbine, means for maintaining a liquid sealing annulus between adjacent zone chambers and between the highest pressure zone chamber and the turbine, means for maintaining a liquid annulus for sealing the lowest pressure zone chamber against atmospheric pressure, and means for withdrawing steam generated in the respective pressure zone chambers and maintaining the successively decreasing pressures therein.

4. The combination with an elastic fluid turbine casing and a rotor shaft extending therethrough, of packing means for sealing said shaft against fluid leakage comprising a series of centrifugal liquid sealing glands each sealing against a portion of the pressure difference between the interior and the exterior of the casing and a pressure chamber disposed between each pair of adjacent glands and communicating therewith, means for admitting liquid to said sealing glands under successively lower pressures, and means for withdrawing the vapor from said pressure chambers and maintaining successively lower pressures in said chambers.

5. A packing device for sealing a rotor shaft against fluid leakage comprising a plurality of centrifugal liquid impellers mounted on the shaft and a gland casing, said casing including a housing for each of said impellers and a pressure zone chamber disposed between adjacent housings and communicating therewith, means for admitting liquid to each of said housings, and means for withdrawing vapor from said pressure zone chamber.

In testimony whereof, I have hereunto subscribed my name this eighth day of June, 1925.

ROBERT C. ALLEN.